United States Patent [19]

Malhotra

[11] 3,998,770
[45] Dec. 21, 1976

[54] PROCESS FOR REDUCING DISCOLORATION AND DARK SPOTTING IN TETRAFLUOROETHYLENE RESIN MOLDED PARTS

[75] Inventor: Satish Chandra Malhotra, Parkersburg, W. Va.

[73] Assignee: E. I. Du Pont de Nemours and Company, Wilmington, Del.

[22] Filed: Dec. 29, 1975

[21] Appl. No.: 645,217

[52] U.S. Cl. .................. 260/17.4 SG; 260/29.6 F; 260/42.14; 260/42.15; 260/42.16; 260/42.18; 260/42.26; 260/42.27; 260/42.54; 260/42.55

[51] Int. Cl.$^2$ ...................... C08L 5/00; C08K 9/04

[58] Field of Search .............. 260/17.4 SG, 29.6 F, 260/42.18, 42.27, 42.54, 42.55, 42.15, 42.14, 42.16, 42.26

[56] References Cited

UNITED STATES PATENTS

| | | | |
|---|---|---|---|
| 3,058,166 | 10/1962 | Fields | 18/55 |
| 3,793,287 | 2/1974 | Fitz et al. | 260/42.22 |
| 3,915,916 | 10/1975 | Leverett | 260/29.6 F |
| 3,929,721 | 12/1975 | Leverett | 260/29.6 F |

*Primary Examiner*—James H. Derrington

[57] ABSTRACT

A means for reducing discoloration or dark spotting occurring at air-starved areas of glass filled agglomerated granular tetrafluoroethylene resin during sintering is described which comprises employing a silicone and an agent that forms a substantially water-soluble complex with iron during the agglomeration of the filled poly-tetrafluoroethylene mixture in liquid.

13 Claims, No Drawings

PROCESS FOR REDUCING DISCOLORATION AND DARK SPOTTING IN TETRAFLUOROETHYLENE RESIN MOLDED PARTS

FIELD OF THE INVENTION

This invention relates to an improved process for preparing granular poly-tetrafluoroethylene molding powders, i.e., resins, containing a glass filler, which resins are agglomerates of small, i.e., fine cut, poly-tetrafluoroethylene particles; and more particularly, to a process for preparing said resins which on sintering under air-starved conditions result in white and substantially spot-free molded parts.

BACKGROUND OF THE INVENTION

Tetrafluoroethylene polymers are useful when molded into parts for bearings and other mechanical devices where low coefficients of friction and good high temperature stability are desirable. These polymers sometimes contain glass fibers to improve their mechanical properties, such as wear resistance.

These molding powders are ordinarily fabricated in a mold under pressure at room temperatue, followed by sintering the preform at a temperature above the melting point of the polymer, e.g., at about 370–400°C. The sintering can be carried out either while the preform is in the mold, or after the preform has been removed from the mold. In either event, if air is excluded from contact with any portion of the preform, then that portion usually appears discolored, e.g., gray in color, and will contain dark specks when the filler is glass. It is believed that the color and the specks are caused by iron impurity in the glass filler. It is believed that this impurity promotes the decompositon of some of the polymer to elemental carbon, thus resulting in the discoloration and spotting. On the other hand, if air is not excluded from contact with the preform, no discoloration and dark spots are seen on its surface, and it is believed that the oxygen in the air aids in burning off the elemental carbon.

Thus, if the preform is removed from the mold prior to sintering so that its surface is exposed to the atmosphere during sintering, no discoloration or dark specks appear on the surface. However, if the preform is thick enough that the air cannot penetrate into the interior of the preform, then during sintering the air-starved interior will become gray and contain dark specks and upon subsequent cutting, the exposed interior reveals the unsightly specks.

Similarly, if the preform is not removed from the mold prior to sintering, but rather remains in the mold during sintering, then air cannot reach the surface of the preform and upon removal of the sintered preform from the mold, the discoloration and specks are present on the surface of the molded article as well as in the interior.

Means for removing the metallic iron impurities are known, e.g., removal from the glass fiber fillers can be accomplished by cleaning the glass before preparing the filled tetrafluoroethylene resin. However, this introduces a separate step into the process, and furthermore, only removes the impurities from one of several possible sources of contamination.

Frequently the molding powder is agglomerated prior to molding it, to obtain better flowability into the mold. The purpose of the agglomeration procedure is to place the resin in a form in which it can flow easily through automatic feeding devices into performing machines.

A means for removing the iron impurities and preventing the dark spots and discoloration during the agglomeration step, whatever the source and without any additional process steps, is desirable.

SUMMARY OF THE INVENTION

It has now been found that by employing the silicone and the complexing agent in the aqueous poly-tetrafluoroethylene mixture to be agglomerated, the complexing agent will complex with the iron impurities and, because of the water solubility of the complex, will cause most of the impurities to remain complexed in the water after the agglomerated tetrafluoroethylene resin is separated and dried. The tetrafluoroethylene resin so obtained can then be sintered without substantial discoloration or spotting in an air-starved environment. The complexing agent and the silicone act synergistically.

The following procedure for agglomerating small particles of tetrafluoroethylene polymers in the presence of filler materials is among those well known. The procedure comprises agitating a mixture of finely-divided (e.g., less than 200$\mu$, preferably between 20 and 50$\mu$) granular tetrafluoroethylene polymer particles and filler material particles in a two-phase liquid medium of water and a substantially water-immiscible organic liquid, and separating the resulting filled agglomerated granules from the liquid medium.

DESCRIPTION OF THE INVENTION

The tetrafluoroethylene polymers used are unsintered, are of the granular type made by suspension polymerization (as distinguished from the "fine powder" type made from aqueous dispersion polymerization followed by coagulation), and are non-melt-fabricable.

By tetrafluoroethylene polymer is meant the homopolymer of tetrafluoroethylene (PTFE) and copolymers thereof wherein the amount of comonomer present in polymerized form is small enough to maintain the non-melt-fabricable nature of the copolymer. Generally, this small amount will be less than 2% by weight based on the weight of the copolymer. The comonomer can be an ethylenically unsaturated copolymerizable monomer of the formula

wherein
R$_1$ separately is F or H;
R$_2$ separately is F or Cl;
R$_3$ can be Cl, —R$_F$, —OR$_F$, —R'$_F$H, —OR'$_F$H, —R'$_F$Cl or —OR'$_F$Cl,
  wherein R$_F$ is linear perfluoralkyl of 1–5 carbon atoms, and R'$_F$ is linear perfluoroalkylene (perfluorinated alkane diradical) of 1–5 carbon atoms in which the designated substituent is an omega substituent;
and
  when R$_2$ is F, R$_1$ and R$_3$ taken together can be

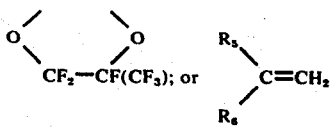

(b)

wherein $R_5$ and $R_6$ are $-CF_3$ or $-CClF_2$. Preferably it will be the perfluoroalkene of 3-6 carbon atoms, e.g., hexafluoropropylene, or a perfluoro(alkyl vinyl ether) of 3-6 carbon atoms, e.g., perfluoro(propyl vinyl ether). These polymers are not melt-fabricable, i.e., they have an apparent melt viscosity of at least $1 \times 10^9$ poises at 380° C.

To obtain apparent melt viscosity, the rate of elongation is measured for a small strip of resin in creep under a known tensile stress. 12 G. of fine powder resin is placed in a 7.6 cm. diameter mold between 0.152 cm. rubber cauls and paper spacers. The mold is then heated at 100° C. for 1 hour. Pressure is then slowly applied on the mold until a value of 140.6 kg./cm.² is obtained. This pressure is held for 5 minutes and then releaed slowly. After the sample disc is removed from the mold and separated from the cauls and paper spacers, it is sintered at 380° C. for 30 minutes. The oven is then cooled to 290° C. at a rate of about 1° C. a minute and the sample is removed. A crackfree rectangular sliver with the following dimensions is cut: 0.152 to 0.165 cm. wide, 0.152 to 0.165 cm. thick, and at least 6 cm. long. The dimensions are measured accurately and the cross-sectional area is calculated. The sample sliver is attached at each end to quartz rods by wrapping with silver-coated copper wire.

The distance between wrappings is 4.0 cm. This quartz rod-sample assembly is placed in a columnar oven where the 4 cm. test length is brought to a temperature of 380°±2° C. A weight is then attached to the bottom quartz rod to give a total weight suspended from the sample sliver of about 4 g. The elongation measurements vs. time are obtained, and the best average value for the creep curve in the interval between 30 and 60 minutes is measured. The specific melt viscosity is then calculated from the relationship $$n = \frac{WL_T g}{3 (dL_T/dt)A_T}$$

where
  $n$ = specific melt viscosity in shear, poises
  $W$ = tensile load on sample, g.
  $L_T$ = length of sample (at 380° C.) cms. (length increases about 8% at 380° C. over that at room temperaure).
  $g$ = gravitational constant, 980 cm./sec.²
  $(dL_T/dt)$ = rate of elongation of sample under load or slope of elongation vs. time plot, cm./sec.
  $A_T$ = cross-sectional area of sample (at 380° C.), cm.² - (area increases about 37% at 380° C. over that at room temperature).

Tetrafluoroethylene polymer granules, as obtained from suspension polymerization, have an average diameter of about 1000 microns. For use in the agglomeration procedure, these granules are ground into finely-divided particles with a $d_{50}$, i.e., average particle size, of below about 200 microns and preferably to a $d_{50}$ of about 20 to 50 microns, for the ability to obtain agglomerates having good molding properties depends on the small initial particle size of the polymer to be agglomerated. The $d_{50}$ will depend on the degree of grinding. Generally, the $d_{50}$ should be at least about 5 microns. The $d_{50}$ is determined by the wet sieving procedure of ASTM D-1457-69.

The substantially water-immiscible organic liquid used should have sufficient immiscibility with the water and sufficient wettability for the finely-divided tetrafluoroethylene polymer to cause formation of the agglomerates on agitation. Generally, the immiscible organic liquid can be soluble in water up to 15% by weight at the operating temperatures of the process. Preferably the solubility will be less than 1%. The organic liquid is present in the water in an amount sufficient to provide a non-aqueous phase. The wettability of the organic liquid can be expressed through its surface tension, which should be no greater than about 40 dynes/cm. at 25° C. Generally, the surface tension should be at least 10 dynes/cm. at 25° C. Examples of organic liquids useful herein include aliphatic hydrocarbons, such as pentane and dodecane; alicyclic hydrocarbons, such as cyclohexane or methyl cyclohexane; aromatic hydrocarbons such as benzene, toluene or xylene; and halogenated hydrocarbons, such as tetrachloroethylene, trichloroethylene, chloroform or chlorobenzene; and the like. Generally, the hydrocarbons will contain no more than 12 carbon atoms, and low-boiling hydrocarbons are preferred for easy removal by drying. The organic liquid generally is present in an amount between 0.1 to 0.5 cc of the organic liquid per gram of tetrafluoroethylene/glass filler blend employed. The exact amount employed will influence the particle size of the agglomerated filled tetrafluoroethylene polymer.

The water, can be demineralized water, if desired, but such is not necessary.

The particulate glass fillers include glass fibers, glass beads, glass flakes and the like. The glass may be present in an amount of from 5% to 40%, preferably 15-25%, by volume based on the volume of the tetrafluoroethylene polymer and the glass. The glass, when in particle form, i.e., bead or powder, should preferably have an average size no greater than about the size of the resultant agglomerates and preferably smaller so that in the resultant free-flowing agglomerates, which are usually of 250 to 1000 micron average particle diameter, the particles are largely enveloped by the polymer. When in fiber or flake form, the length of the fiber or the largest length of the flake, as the case may be, should preferably be less than the size of the resulting agglomerate. However, protruding portions of the fiber, flake or particle are not substantially deleterious to powder flow.

The silicone employed herein is a silicone fluid (oil), gum or resin which can be linear or cross-linked. Ordinarily, commercial silicones are mixtures of silicone polymers. Generally the structure of the recurring units of the linear silicones is

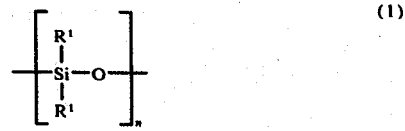

(1)

while the structure of the recurring units of the cross-linked silicones is

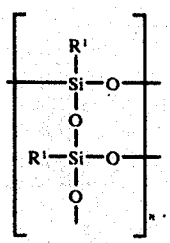 (2)

Resins, of course, are cross-linked, whereas fluids are linear. The number of such recurring units in any one polymer is ordinarily between 10 and 5000, preferably 10 and 2000 and most preferably 10 and 200.

The recurring silicone units in the polymer are ordinarily end-capped with

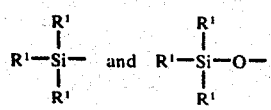

units, depending, of course, upon whether the end-cap is at the —Si— or the —O— of the recurring unit. $R^1$ in the formulas above can be the same or different within any one recurring unit and is a hydrocarbyl radical of 1 to 20 carbon atoms, e.g., alkyl, aryl, alkaryl and aralkyl and can be hydrogen provided no more than one hydrogen is attached to any one Si atom. The silicone can also be modified with up to 4% (0–4%) hydroxy function. Preferably, the $R^1$ groups are methyl and phenyl.

The silicone is present in the mixture to be agitated in an amountt of between about 0.01% to 0.5% of the weight of the mixture to be agglomerated, preferably 0.05 to 0.10%. Examples of silicones include phenyl methyl siloxane, dimethyl siloxane optionally containing 0.5% hydroxy function, monophenyl siloxane optionally containing 1.5% hydroxy function, monophenyl siloxane optionally containing 4.0% hydroxy function, and propyl modified monophenyl siloxane.

In addition, the silicone can contain a filler as a thickener, such as silica. Preferably, the silicone is a silicone fluid, i.e., one where the recurring units are linear and the number of such units is between 10 and 200.

The complexing agent, e.g., chelating agent, coordinating agent, and the like, for the iron impurities is one that will result in a complex that is soluble in water or a basic solution. Such agents include sugars, especially sucrose (in the presence of $H_2O_2$), hydroxyorganic acids and the amino-organic acids. Examples include the $\alpha$, $\beta$ or $\gamma$ hydroxy- and amino-hydrocarbyl carboxylic acids of 2 to 12 carbon atoms and containing at least 1 hydroxy or amino group and up to 8 such groups, and 1–4 carboxyl groups. Preferably, the complexing agents include citric acid, tartaric acid, the ammonium or sodium salts of citric acid, ethylene diaminetetraacetic acid, sucrose in $H_2O_2$, and the like. The amount of the complexing agent present will depend on the amount of iron impurity present, and will be an amount effective to complex with the iron. Generally, the amount of complexing agent present will be between 0.001 and 1% of the weight of glass filler present. Preferably, the amount will be between 0.3 and 0.7% of the weight of the glass filler The order in which the ingredients used in the process of this invention are mixed together is not critical. Preferably, the silicone will be added to the polytetrafluoroethylene and the glass in a dry blender or added thereto as a solution in an organic liquid.

If desired, and especially with silicone resins present, a small amount of an aminosilane can be added to increase the amount of filler material in the agglomerated product as taught by U.S. Pat. application Ser. No. 531,481, filed Dec. 11, 1974, now U.S. Pat. No. 3,915,916. If desired also a small amount of an electrolyte, such as ammonium carbonate, can be added to decrease the electrostatic charge on the resulting agglomerates as taught by U.S. Pat. application Ser. No. 324,503, filed Jan. 17, 1973 and published as Trial Voluntary Protest Application B 324, 503 on Jan. 28, 1975. If the amino silane is employed, the complexing agent is preferably added last to avoid any premature interaction with the silane. However, if the electrolyte is one that raises the pH, it should be added after the complexing agent since complexing is favored at lower pH levels.

The mixture to be agglomerated ordinarily contains from about 5 to about 30% by weight solids. The mixture is slurried by agitation whereupon agglomeration of the initial blend occurs. The degree of agitation is not critical and can be varied to obtain particles of the size desired. The degree, temperature and time of agitation are interdependent, e.g., with more vigorous agitation, shorter times can be used. Generally, the mixture can be agitated for between about 5 and 120 minutes at a temperature of between 0 and about 100° C. provided the temperature is not high enough to cause boiling at the pressure used. For convenience, the agitation may ordinarily be carried out at 10°–90° C., and preferably 25°–70° C. Pressure is not critical and the agitation is usually carried out at atmospheric pressure in an ordinary baffled treatment vessel. The agitation may be varied during preparation, usually by reducing the agitation during the process, e.g., from agitation at a power of 7–16 joules/sec —liter to a power of 0.2–15 joules/sec –l., but such is not necessary.

Following agitation, the resulting agglomerated blend is separated from the liquid medium of filtration, which removes mainly the water phase, and may be washed with water.

Although drying can be carried out at temperatures up to just below the sintering temperature of the tetrafluoroethylene polymer, drying is usually carried out at between 125° C. and 200° C.

As discussed earlier, the agglomerates are especially useful in automatic molding machines because of their good flow properties. upon sintering, the sintered articles are substantially free of discoloration and dark spots, as a result of the treatment during the preparation of the agglomerates according to the procedures described herein. Such freedom from discoloration and dark spots is shown by the examples which follow.

EXAMPLES 1 AND 1A AND COMPARISON 1

In Example 1 and 1A and Comparison 1 the following general procedure was used:

A 4-liter stainless steel cylindrical pelletization vessel, equipped with baffles and an agitator, and provided with means for external steam heating, was charged with 1000 ml demineralized water, 60 ml perchloroethylene (PCE) containing 0.1 g Dow Corning Z-6018 silicone, a propyl modified monophenyl siloxane of about 1600 molecular weight with a degree of substitution of 1.0, and 0.5 ml of γ-aminopropyltriethoxysilane (Union Carbide amino silane A-1100). Two hundred grams of a 25% fiberglass/75% granular polytetrafluoroethylene (PTFE) blend was agitated at 70° C. and at 1000 rpm in the mixture. After 5 minutes, the agitation was reduced to 600 rpm and temperature to 60°–65° C. and the operation continued for another 85 minutes. Ammonium carbonate in an amount of 0.7 g was added at the beginning of the reduced agitation. On completion of the operation, the contents of the vessel was drained through a 60 mesh screen, washed thoroughly with water, dried in a vacuum oven at 140° C., and sized using 16 and 60 mesh screens. Once-through yield for the +16, +60 mesh fraction was 82%. A 2.86 cm. diameter, 0.86 cm. thick molding made out of the sized product at 702 kg/cm² was sintered under nitrogen (to simulate an air-starved environment in ram extrusion) at 370° C. for 4 hours.

EXAMPLE 1

The general procedure was employed except that 2.5 gm of anhydrous citric acid was added just after the agitation was reduced to 600 rpm. Once-through yield was 85.5%. The sintered molding was white and substantially non-spotted.

EXAMPLE 1A

The general procedure was employed except that 5 gm sucrose and 80 ml 30% $H_2O_2$ solution was added just after the agitation was reduced to 600 rpm. The sintered molding was white and substantially non-spotted.

Comparison 1

The general procedure was employed. The sintered molding was somewhat disclored and more spotty than the moldings of Examples 1 and 1A.

2, PARTS A–D AND COMPARISON 2, PARTS A–C

The effect of the addition of the silicone and the complexing agent on the appearance of the molded article can be seen in this Example and its Comparison. In all, the general procedure was employed, except that in the Comparisons no amino silane was present. The amounts of ingredients used and the appearance are set forth in Table 1.

Comparison 2A

It is seen from Table 1 that when no silicone and no complexing agent are present, the appearance is grayish and dark spots are present.

Comparison 2B

It is seen from Table 1 that when no complexing agent is present, but silicone is present, some improvement occurs in color and dark spotting, but discoloration and dark spotting are still present.

Comparison 2C

It is seen from Table 1 that when the complexing agent is present, but the silicone is not present, the discoloration and dark spotting is not improved over that of Comparison 2A.

EXAMPLES 2A, 2B, 2C, and 2D

It is seen from Table 1 that when varying amounts of both the silicone and the complexing agent are present, the degree of discoloration and dark spotting are less than when one or the other is not present.

The sintered molded parts of the Examples had good tensile strength and elongation properties and acceptable SSG values.

TABLE 1

Effect of Additives on Appearance of Pelletized[1] Product

| Example or Comparison | Dow-Corning Z-6018 Silicone, g | Complexing Agent (Anhydrous Citric Acid), g | Glass[2] in Packout, % | Appearance Factor[3] |
|---|---|---|---|---|
| Comparison 2A | 0 | 0 | 15.6 | 5.0 |
| Comparison 2B | 0.1 | 0 | 18.0 | 8.0 |
| Comparison 2C | 0 | 0.15 | 15.7 | 3.0 |
| Example 2A | 0.1 | 0.15 | 22.2 | 9.5 |
| Example 2B | 0.03 | 0.6 | 21.4 | 9.0 |
| Example 2C | 0.1 | 0.6 | 22.2 | 9.0 |
| Example 2D | 0.4 | 0.6 | 22.0 | 10.0 |

[1]Pelletization runs were conducted, using water = 1600 ml, PCE = 60 ml, feed=200 g, $(NH_4)_2CO_3$ = 0.7 g. Citric acid was added 5 min. after the start of the pelletization; $(NH_4)_2CO_3$ was added 15 min. before the end of the 90 min. run. The preforms were made at 562 kg/cm² and sintered in nitrogen at 380° C. for 1 hour.
[2]Feed precursor contained 22.6% glass in Teflon. The amount of glass in the compositions was ascertained by heating samples in platinum crucibles at 700° C. for 1 hour and determining amounts of the glass residues.
[3]Appearance Factor: Very gray and spotty, sintered composition = 0.0, white and spotless = 10.00.

EXAMPLES 3A, 3B, and 3C

The general mixing procedure used in Example 1 was employed except that no aminosilane was present and ammonium carbonate in an amount of 1.4 g was added five minutes before the end of the agitation. The amounts of the ingredients used and the appearance are set forth in Table 2.

TABLE 2

Effect of Silicone Type on Appearance of Pelletized[1] Product

| Example | Silicone Type (0.14 g) | Glass[2] in Packout, % | Appearance Factor |
|---|---|---|---|
| 3A | Dow Corning, Z-6018 (Silicone Resin) | 16.2 | 8.5 |
| 3B | Dow Corning High Vacuum Grease[3] (Dimethyl polysiloxane Silicone fluid containing silica thickener) | 14.9 | 9.5 |
| 3C | Dow Corning 710 Silicone Oil (Silicone Fluid) (A phenyl methyl | 14.4 | 10.0 |

TABLE 2-continued
Effect of Silicone Type on Appearance of Pelletized[1] Product

| Example | Silicone Type (0.14 g) | Glass[2] in Packout, % | Appearance Factor |
|---|---|---|---|
| | polysiloxane) | | |

[1]Pelletization runs were conducted, using water = 1600 ml, perchloroethylene = 63 ml, feed = 200 g, anhydrous citric acid = 0.15 g, $(NH_4)_2CO_3$ = 1.4 g. The citric acid was added 5 min after the start of the pelletization, $(NH_4)_2CO_3$ was added 5 min before the end of the 60 min run. The pelletized product was not water washed. The preforms were made at 562 kg/cm² and sintered in nitrogen at 380° C for 1 hour.
[2]Feed precursor contained 20% glass in TEFLON.
[3]The high vacuum grease was added as a suspension in perchloroethylene.

Comparison 4A and Examples 4A and 4B

The general mixing procedure used in Example 1 was made in a 20 gallon vessel, using the amounts given in Table 3.

TABLE 3
Effect of Additives on Appearance of Pelletized[1] Product

| Comparison or Example | Dow Corning High Vacuum Grease[2] (Silicone Fluid Containing Silica Thickener) (g) | Anhydrous Citric Acid (g) | Appearance Factor |
|---|---|---|---|
| Comparison 4A | — | — | 5.0 |
| Example 4A | — | 8.0 | |
| Example 4B | 1.36 | 9.0 | |

[1]Pelletization runs were made using 84 lb water, 1480 ml perchloroethylene, 10 lb feed precursor, and 32 g ammonium carbonate buffer. Citric acid was added 5 min after the start of the pelletization, ammonium carbonate was added 5 min before the end of the 60 min run. The pelletized product was water washed.
[2]The high vacuum grease was added as a suspension in perchloroethylene and is the one used in Example 3B.

The embodiments of the invention in which an exclusive property or privilege is claimed are as follows:

1. In the process for preparing glass filled agglomerated granules of non-melt-fabricable granular tetrafluoroethylene polymer by agitating a finely-divided blend of said granular tetrafluoroethylene polymer and said glass filler in which the average particle size of the finely-divided tetrafluoroethylene polymer is below about 200 microns and in which the glass filler is present in an amount between about 5% and 40% by volume based on volume of polymer and filler in a two-phase liquid medium consisting essentially of water and an organic liquid which is soluble in water up to at most 15% by weight at the operating temperature of the process and which has a surface tension no greater than about 40 dynes/cm. at 25° C., and in which the oganic liquid is present in an amount of 0.1 to 0.5 cc per gram of said blend and in which the resulting glass filled agglomerated granules are separated from the liquid medium, the improvement wherein said liquid medium additionally contains a silicone present in an amount of between 0.01% and 0.5% by weight based on weight of said blend, and a complexing agent selected from sugars, hydroxy-organic acids or amino-organic acids present in an amount effective to complex with iron impurity.

2. The process of claim 1 wherein the medium also contains an amino-fuctional organosilane.

3. The process of claim 1 wherein the complexing agent is an α, β or γ-hydroxy- or amino-hydrocarbyl carboxylic acid of 2-12 carbon atoms and containing at least 1 hydroxy or amino group and up to 8 such groups, and 1-4 carboxyl groups.

4. The process of claim 3 wherein the complexing agent is citric acid.

5. The process of claim 3 wherein the agitation is carried out at a temperature of between 0 and almost 100° C. provided the temperature is not high enough to cause boiling of the liquid medium.

6. The process of claim 5 wherein the organic liquid is perchloroethylene.

7. The process of claim 5 wherein the silicone is a fluid, gum or resin.

8. The process of claim 5 wherein the silicone is a linear silicone containing the recurring structural unit

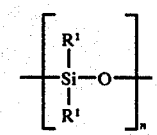

wherein each $R^1$ independently is a hydrocarbyl group of 1-20 carbon atoms and one $R^1$ may be hydrogen, and n is an integer of between about 10 and about 200.

9. The process of claim 8 wherein the silicone is present in an amount of 0.05 to 0.1% by weight based on weight of said blend.

10. The process of claim 9 wherein the glass filler is present in an amount of 15-25% by volume based on volume of polymer and filler.

11. The process of claim 5 wherein the silicone is a crosslinked silicone.

12. The process of claim 1 wherein the tetrafluoroethylene polymer is a tetrafluoroethylene copolymer wherein the comonomer is of the formula

wherein
$R_1$ separately is F or H;
$R_2$ separately is F or Cl;
$R_2$ can be Cl, $-R_F$, $-OR_F$, $-R'_FH$, $-OR'_FH$, $-R'_FCl$ or $-OR'_FCl$,
wherein $R_F$ is linear perfluoralkyl of 1-5 carbon atoms, and $R'_F$ is linear perfluoroalkylene (perfluorinated alkane diradical) of 1-5 carbon atoms in which the designated substituent is an omega substituent; and
when $R_2$ is F, $R_1$ and $R_3$ taken together can be

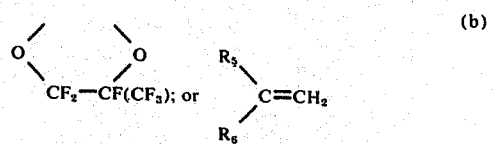

wherein $R_5$ and $R_6$ are $-CF_3$ or $-CClF_2$.

13. The process of claim 12 wherein the comonomer is perfluoroalkene of 3-6 carbon atoms or perfluoro(alkyl vinyl ether) of 3-6 carbon atoms.

* * * * *